(12) United States Patent
Regnard et al.

(10) Patent No.: US 10,787,895 B2
(45) Date of Patent: Sep. 29, 2020

(54) DRILLING OPERATION APPARATUS, METHODS, AND SYSTEMS

(71) Applicant: Halliburton Energy Services, Inc., Houston, TX (US)

(72) Inventors: Stephan Regnard, Brussels (BE); Nuno da Silva, Brussels (BE); Daniel Ruiz Romera, Ghent (BE)

(73) Assignee: Halliburton Energy Services, Inc., Houston, TX (US)

( * ) Notice: Subject to any disclaimer, the term of this patent is extended or adjusted under 35 U.S.C. 154(b) by 247 days.

(21) Appl. No.: 15/555,935

(22) PCT Filed: Apr. 15, 2015

(86) PCT No.: PCT/US2015/025997
§ 371 (c)(1),
(2) Date: Sep. 5, 2017

(87) PCT Pub. No.: WO2016/167766
PCT Pub. Date: Oct. 20, 2016

(65) Prior Publication Data
US 2018/0045030 A1    Feb. 15, 2018

(51) Int. Cl.
| | |
|---|---|
| E21B 44/04 | (2006.01) |
| G06Q 10/04 | (2012.01) |
| E21B 7/04 | (2006.01) |
| E21B 45/00 | (2006.01) |
| E21B 49/00 | (2006.01) |
| G05B 15/02 | (2006.01) |
| E21B 10/08 | (2006.01) |
| E21B 10/567 | (2006.01) |

(52) U.S. Cl.
CPC ............... *E21B 44/04* (2013.01); *E21B 7/04* (2013.01); *E21B 45/00* (2013.01); *E21B 49/00* (2013.01); *G05B 15/02* (2013.01); *G06Q 10/04* (2013.01); *E21B 10/08* (2013.01); *E21B 10/567* (2013.01)

(58) Field of Classification Search
CPC ....... E21B 44/00; E21B 44/005; E21B 49/003
See application file for complete search history.

(56) References Cited

U.S. PATENT DOCUMENTS

| | | | |
|---|---|---|---|
| 8,977,501 B2 | 3/2015 | Benson et al. | |
| 9,784,089 B2 * | 10/2017 | Boone | E21B 44/02 |
| 2003/0122067 A1 | 7/2003 | Radtke et al. | |

(Continued)

OTHER PUBLICATIONS

International Search Report and Written Opinion of PCT Application No. PCT/US2015/025997 dated Dec. 10, 2015: pp. 1-14.

(Continued)

*Primary Examiner* — Kipp C Wallace
(74) *Attorney, Agent, or Firm* — Chamberlain Hrdlicka

(57) ABSTRACT

In some embodiments, an apparatus and a system, as well as a method and article, may operate to generate a surface representing mechanical specific energy as a function of dimensionless products of downhole drilling process variables. Additional actions may include characterizing an area of the surface for different drill bit types, and operating a controlled device according to a location of run data associated with at least one of the different drill bit types and the area on the surface. Additional apparatus, systems, and methods are disclosed.

20 Claims, 9 Drawing Sheets

(56) References Cited

U.S. PATENT DOCUMENTS

| | | | |
|---|---|---|---|
| 2011/0214878 A1* | 9/2011 | Bailey | E21B 7/00 |
| | | | 166/369 |
| 2012/0118637 A1* | 5/2012 | Wang | E21B 44/00 |
| | | | 175/24 |
| 2012/0287134 A1 | 11/2012 | Pessier et al. | |
| 2013/0127900 A1* | 5/2013 | Pena | G09G 5/003 |
| | | | 345/619 |
| 2014/0277752 A1* | 9/2014 | Chang | E21B 44/00 |
| | | | 700/275 |
| 2014/0318866 A1* | 10/2014 | Lewis | E21B 41/0092 |
| | | | 175/40 |
| 2015/0129306 A1* | 5/2015 | Coffman | E21B 49/003 |
| | | | 175/25 |

OTHER PUBLICATIONS

Teale, "The Concept of Specific Energy in Rock Drilling," Int. J. Rock Mech. Mining Sci., Mar. 1965, vol. 2(1): 57-73.

* cited by examiner

DRILLING OPERATION APPARATUS, METHODS, AND SYSTEMS

BACKGROUND

Understanding the structure and properties of geological formations often reduces the cost of drilling wells for oil and gas exploration. Measurements are typically performed in a borehole (i.e., downhole measurements) in order to attain this understanding. Downhole measurements may be used to quantify the progress of drilling operations.

To obtain such measurements, a variety of sensors and mounting configurations may be used. However, when many different types of data have been accumulated, the result can be confusing, making it difficult to determine useful relationships between the values of numerous variables, such as torque, weight on bit, rotation speed, and penetration rate. The result can be a loss in drilling efficiency.

DETAILED DESCRIPTION

Introduction to Various Embodiments

Figure 1:
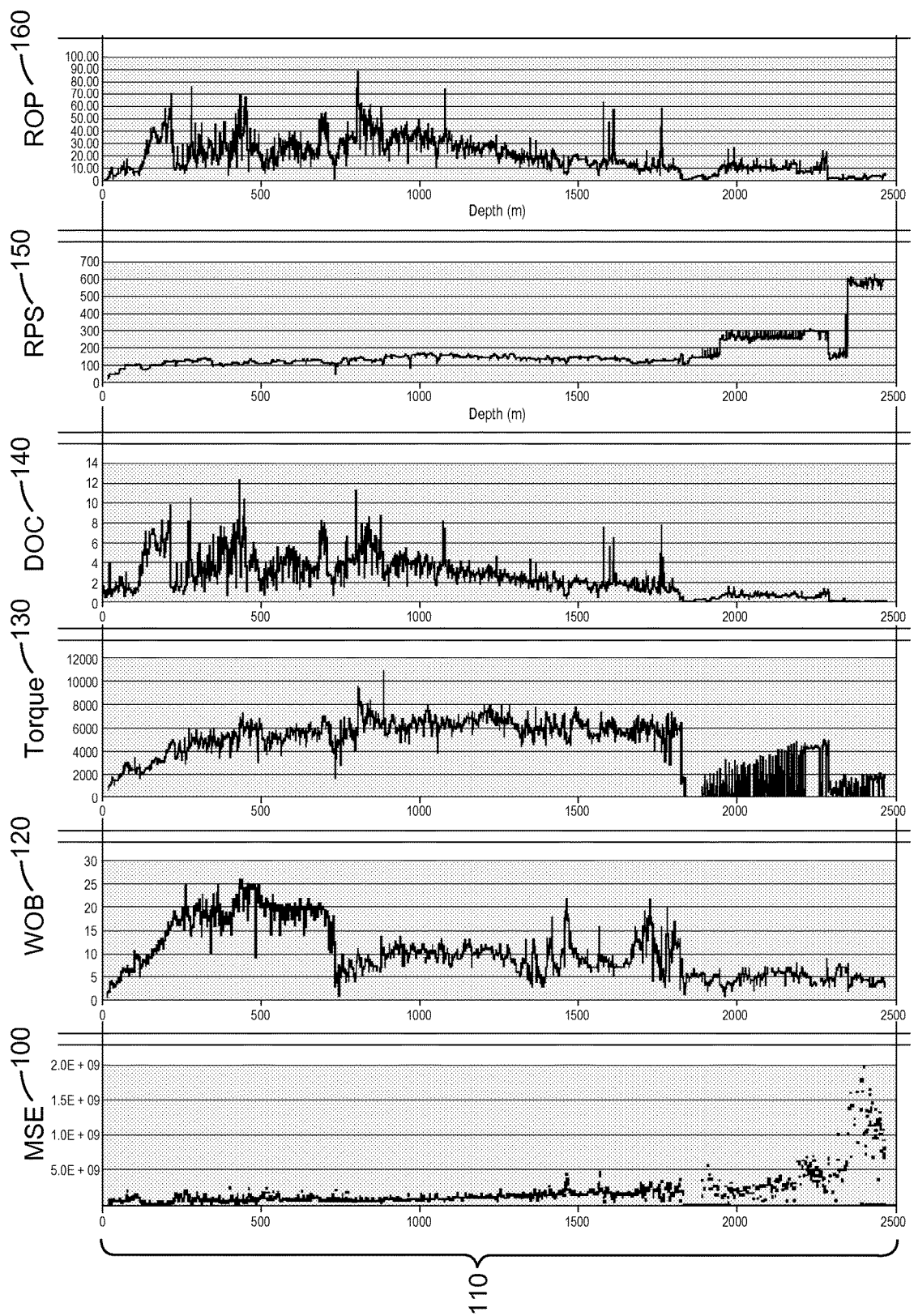
FIG. 1 illustrates changes in mechanical specific energy, and associated drilling process variables, according to various embodiments of the invention.

To address some of the challenges noted above, among others, many embodiments operate to use dimension analysis as a mechanism to reveal the relationship between drilling process variables. For example, a dimensional matrix can be used to generate dimensionless products of the variables involved in mechanical specific energy (MSE) calculation to visualize recorded data in a three-dimensional (3D) graph and make decisions based on recorded drill run data.

Drilling process control can then be implemented with respect to determinations of which bit to use, and what torque, weight on bit, rotation speed, and penetration rate might provide greater efficiency. In many embodiments, the dimensional analysis can be used to process "rate of penetration", "rotation speed", "torque", "weight on bit", "bit diameter" and "mechanical specific energy" (MSE) to generate three dimensionless products, which can be displayed as axes on a 3D graph. The resulting data can then be located on a surface in the 3D graph.

This new mechanisms of processing drill run data to enables the determination of bit behavior over a variety of different drill bit types, along with respective drilling efficiencies. Moreover, bits can be compared in a given application and to more easily identify parameters that are involved in the loss of efficiency. The use of this mechanism can be applied to monitor and control drilling operations in real-time, in order to bring about greater efficiency in those operations.

For the purposes of this document, "characterizing a surface" means determining the boundary of an area on the surface where a desired group of data is located. In many embodiments, the boundary does not have to be precisely determined, as long as at least 70%, or 80%, or 90% of the data (depending on the particular implementation) is contained within the boundary. This will be shown in several examples that follow.

Detailed Description of Various Embodiments

MSE can be defined as the energy required to destroy a unit volume of rock. The concept of MSE is known to those of ordinary skill in the art, and has been defined in "The Concept of Specific Energy in Rock Drilling" by R. Teale, Int. J. Rock Mech. Mining ScL, Vol. 2, pp. 57-73. 1965. In most embodiments, MSE is used as a way to analyze drilling efficiency. This implementation will now be explained.

In rotary non-percussive drilling, the work is done by thrust F (N), and torque T (Nm). If the rotation speed is measured by the number of revolutions per second (RPS), with the area of the borehole being A (m$^2$), and the rate of penetration (ROP) being measured in m/s, the work done in one second is:

$$(F \times ROP) + (2\pi RPS \times T). \quad (1)$$

The volume of rock excavated per second is then:

$$(A \times ROP). \quad (2)$$

Using MSE as the specific energy, and dividing work by volume, gives:

$$MSE = \left(\frac{F}{A}\right) + \left(\frac{2\pi T \times RPS}{A \times ROP}\right). \quad (3)$$

Thus, the lower the MSE, the more efficient the drilling system.

FIG. 1 illustrates changes in mechanical specific energy 100, and other associated drilling process variables 120, 130, 140, 150, 160 according to various embodiments of the invention. Here a graph of the computed MSE 100 as a function of depth 110 gives a synthetic view of the weight on bit (WOB) 120, applied torque (T) 130, depth of cut (DOC) 140, rotation speed (RPS) 150, and the resulting penetration rate (ROP) 160. This particular example, shows drill run data over a series of depths, from 0 to 2500 m, as drilling operations are conducted through different rock formations, using different types of bits. The MSE provides information on drilling operation efficiency, but the relationship between the drilling process variables 120, 130, 140, 150, 160 is difficult to visualize and understand. The solution, in many embodiments, is to generate a surface determined by a series of dimensionless products of the drilling process variables.

To initiate the process of generating the surface, the set of drilling process variables associated with the MSE, measured in Pa or kg/m·s², can be set forth as follows: torque (T) in N·m or kg·m²/s², rate of penetration (ROP) in m/s, revolutions per second (RPS) in 1/s, diameter of the borehole D in m, and weight on bit (WOB) in N or kg·m/s².

Methods used to generate dimensionless products of variables are well known to those of ordinary skill in the art. Those that desire further information can refer to the literature, including works such as "Applied Dimensional Analysis and Modeling" by Szirtes, T., Elsevier, 2007. Using these principles, the following independent products ($\pi 1$, $\pi 2$, $\pi 3$) can be obtained from the MSE and drilling variables discussed above. These products $\pi 1$, $\pi 2$, $\pi 3$ are defined herein as:

$$\pi 1 = T^1 \times D^{-1} \times WOB^{-1} = \frac{T}{D \times WOB} \quad (4)$$

$$\pi 2 = ROP^1 \times RPS^{-1} \times D^{-1} = \frac{ROP}{D \times RPS} \quad (5)$$

$$\pi 3 = MSE^1 \times D^2 \times WOB^{-1} = \frac{MSE \times D^2}{WOB} \quad (6)$$

The ratio of T/WOB is related to friction F, and the ratio ROP/RPS is related to the depth of cut DOC.

The value of MSE, and the associated values of the dimensionless products (which are directly related to the values of the drilling process variables, as shown in equations 4-6) can be displayed in the form of a 3D graph, or surface. This is a result of realizing that there is a function f(T,ROP,MSE,RPS,D,WOB) that is a constant. This first function can be expressed as follows:

$$\left(\frac{F}{A}\right) + \left(\frac{2\pi T \times RPS}{A \times ROP}\right) - MSE = 0 \quad (7)$$

The Buckingham $\pi$ theorem states that if there is a physically meaningful equation involving a certain number n of physical variables, and k is the rank of the dimensional matrix, then the original expression is equivalent to an equation involving a set of p=n-k dimensionless parameters constructed from the original variables. Therefore, the function f($\pi 1$, $\pi 2$, $\pi 3$) is also a constant. This second function, which is the equation of a surface, can be expressed as follows:

$$\pi 3 - \frac{8 \cdot \pi 1}{\pi 2} = \frac{4}{\pi} \quad (8)$$

Figure 2:
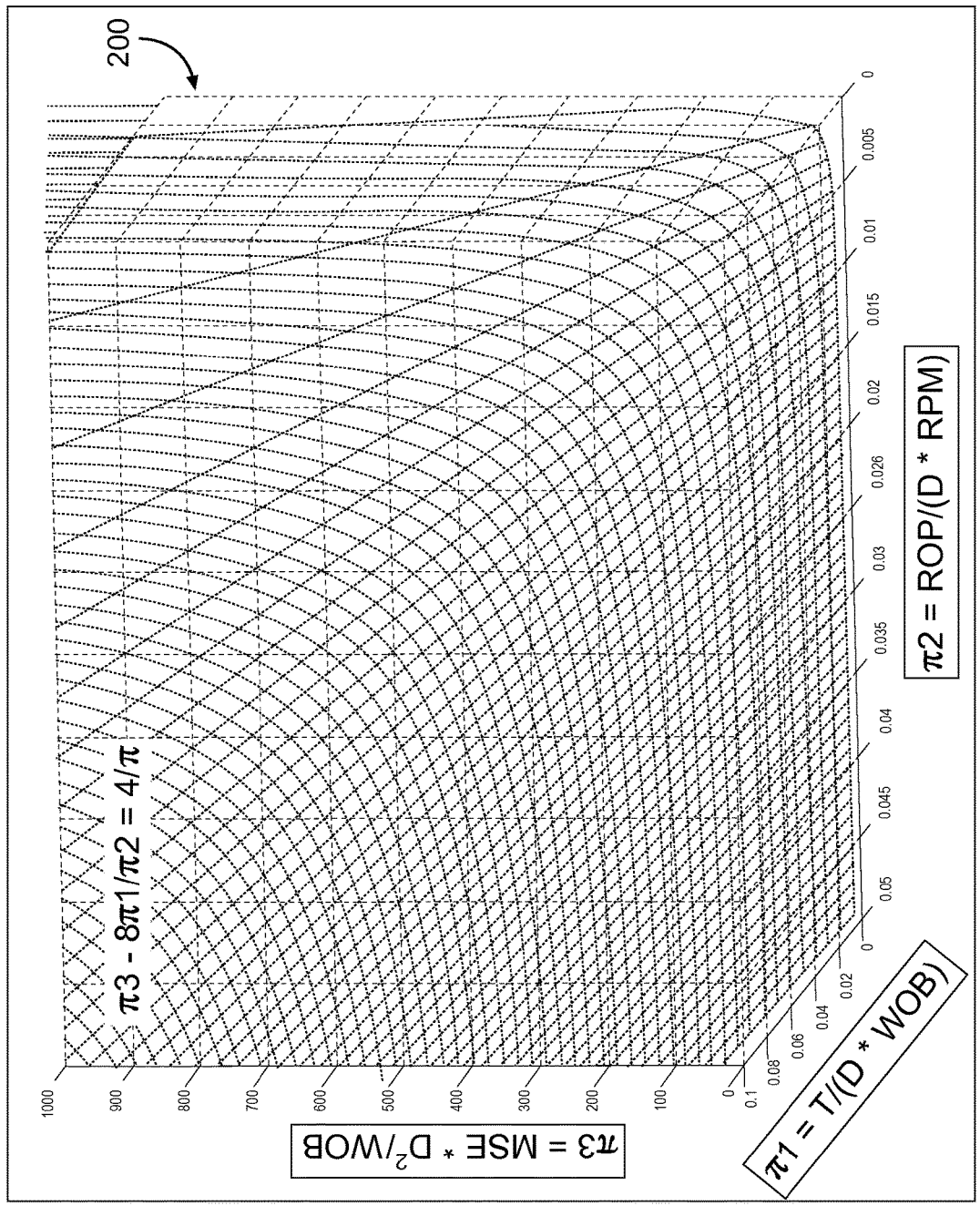
FIG. 2 is a three-dimensional graph illustrating a surface defined by mechanical specific energy as a function of dimensionless variables, according to various embodiments of the invention.

FIG. 2 is a three-dimensional graph illustrating a surface 200 defined by mechanical specific energy as a function of dimensionless variables $\pi 1$, $\pi 2$, and $\pi 3$, according to various embodiments of the invention. More specifically, the surface 200 is defined by equation (8).

Figure 3:
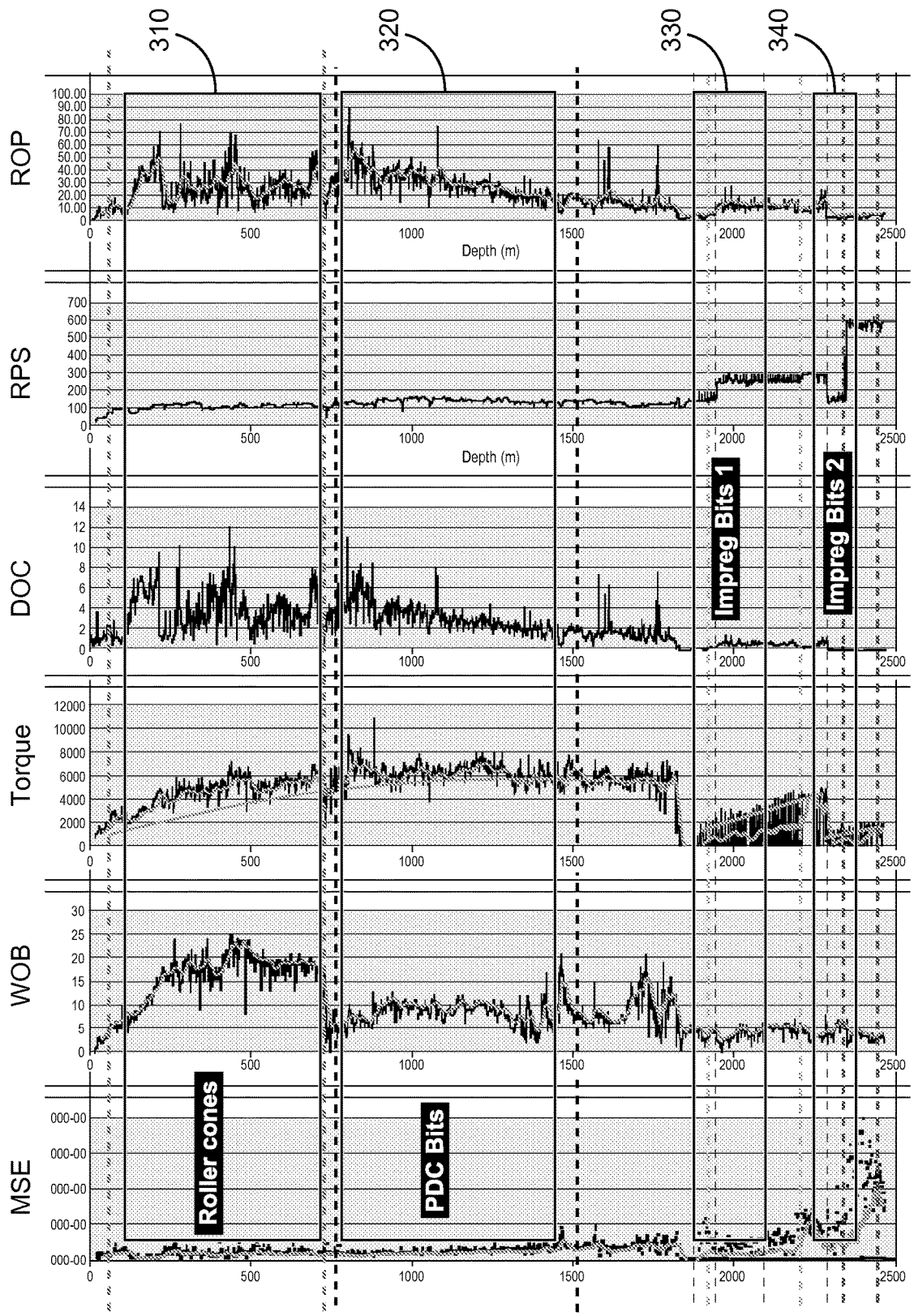
FIG. 3 makes use of drill run data to illustrate a correlation between different drill bit types and changes in mechanical specific energy, according to various embodiments of the invention.

FIG. 3 makes use of drill run data to illustrate a correlation between different drill bit types and changes in mechanical specific energy, according to various embodiments of the invention. Here, the data associated with different drill bit types used in the drilling operation of FIG. 1 (e.g., roller cone bits 310, polycrystalline diamond compact (PDC) bits 320, impregnated bits type 1 (e.g., natural diamond) type 1 330, and impregnated bits type 2 (e.g., thermally stable polycrystalline) 340), has been characterized by sorting the information into groups to produce FIG. 3. It can be seen that this representation of the information does not readily lend itself to a determination of relationships between the variables.

Figure 4:
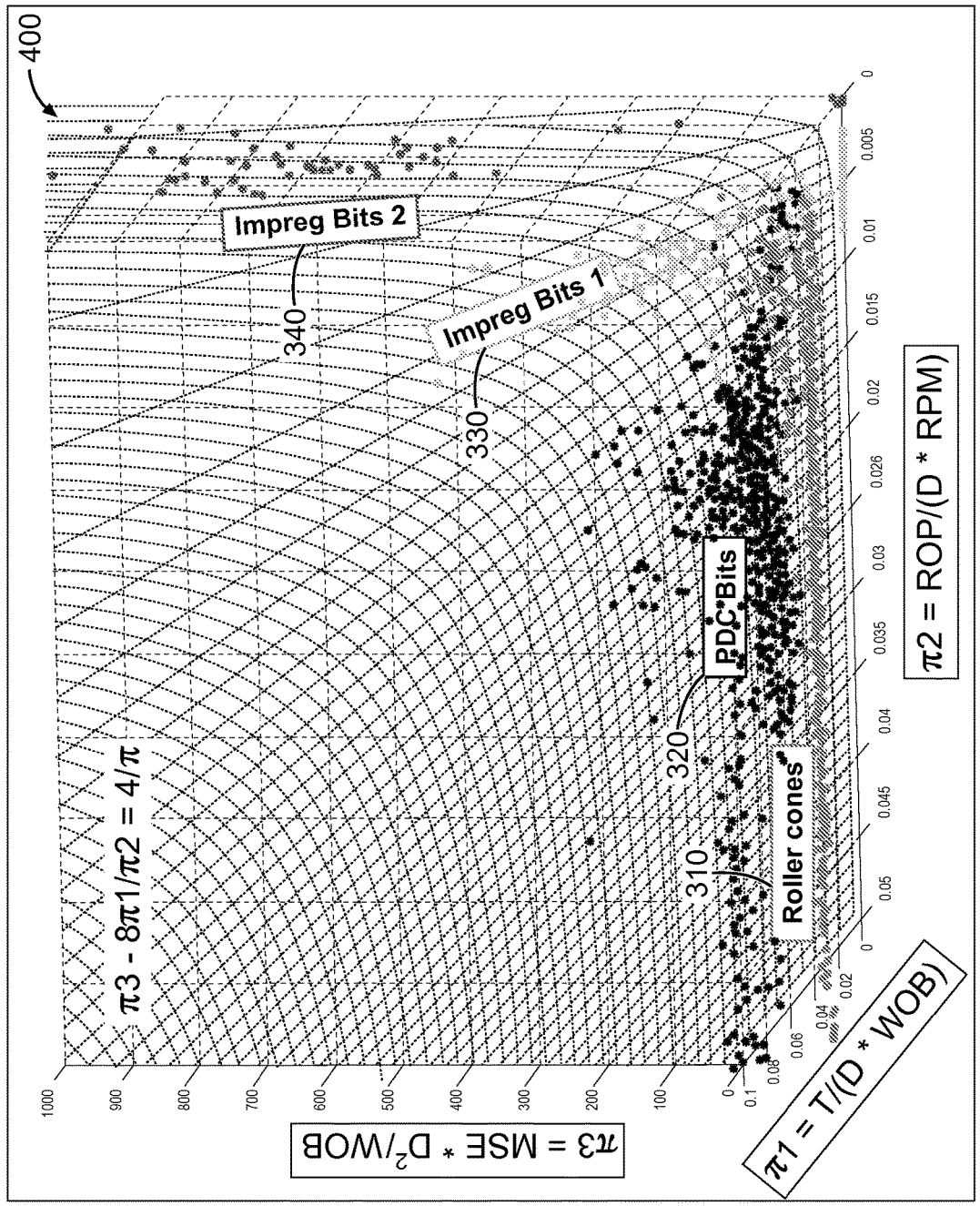
FIG. 4 illustrates a surface defined by mechanical specific energy as a function of dimensionless variables to more clearly show the effectiveness of using different drill bit types, according to various embodiments of the invention.

As an alternative, FIG. 4 illustrates a surface 400 defined by mechanical specific energy as a function of dimensionless variables to more clearly show the effectiveness of using different drill bit types 310, 320, 330, 340, according to various embodiments of the invention. Here the drill run data shown in FIG. 1 is projected onto the surface 400 (defined by the equation $\pi 3 - 8 \cdot \pi 1/\pi 2 = 4/\pi$). This form of display more clearly separates the data associated with different drill bit types 310, 320, 330, and 340 by visibly clustering that data into localized areas of the surface 400. The separation of the information into clusters makes it much easier to determine the drilling efficiency associated with various different drill bit types 310, 320, 330, 340. In this way, the data from different types of drill bits is seen to appear in different areas of the surface, providing information on the cutting mechanism and drilling efficiency of the individual bit types. Characterizing the surface may thus mean in this case to define, by experimentation and data analysis, the areas on the surface $\pi 3 - 8\pi 1/\pi 2 = 4/\pi$ where the data for a specific type of drill bit can be found. In this way, the run data is located on the surface after it is generated, so that data group locations corresponding to different bit types can be established.

Figure 5:
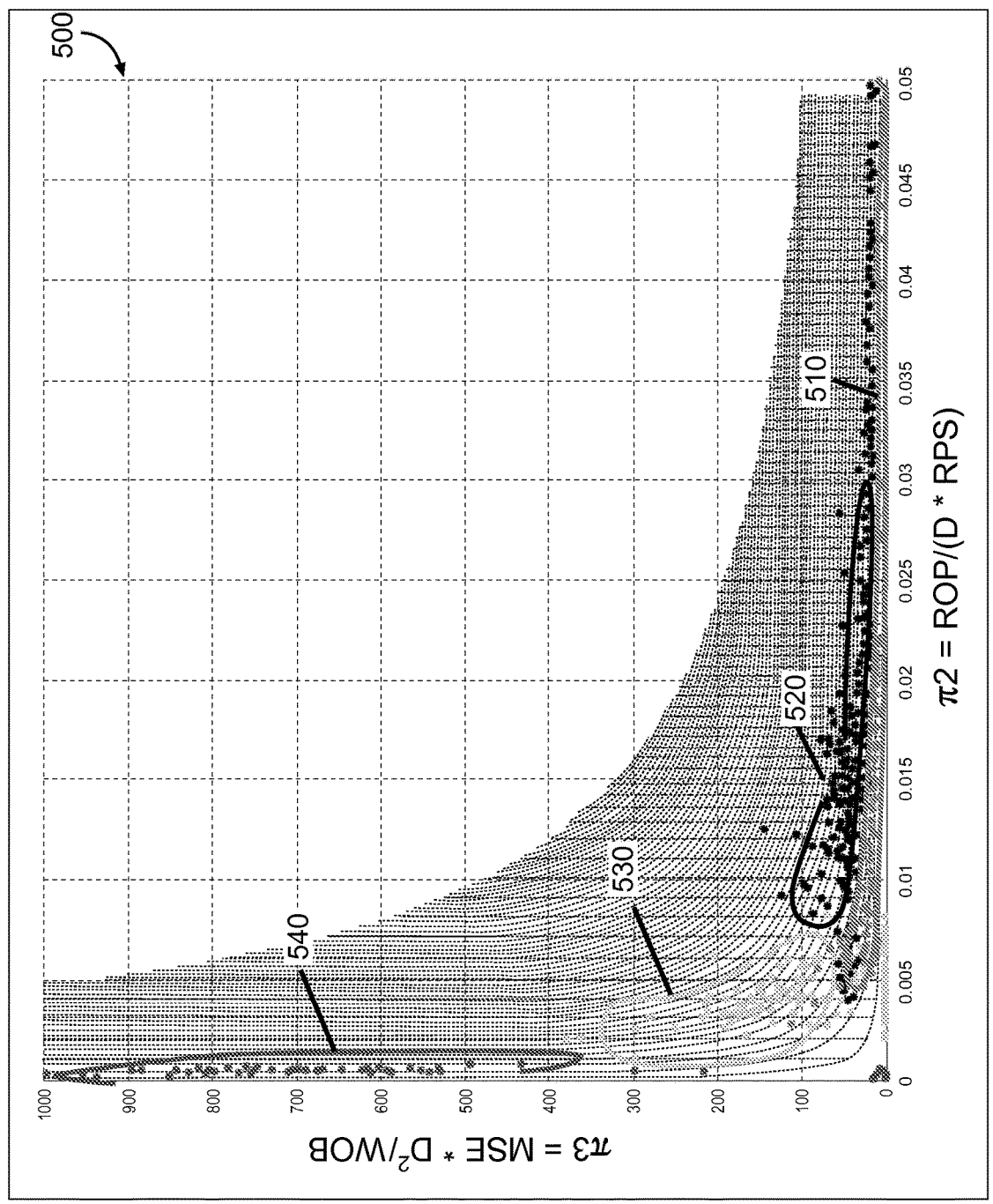
FIG. 5 is a π2-π3 plane projection view of the surface shown in FIG. 4, according to various embodiments of the invention.
Figure 6:
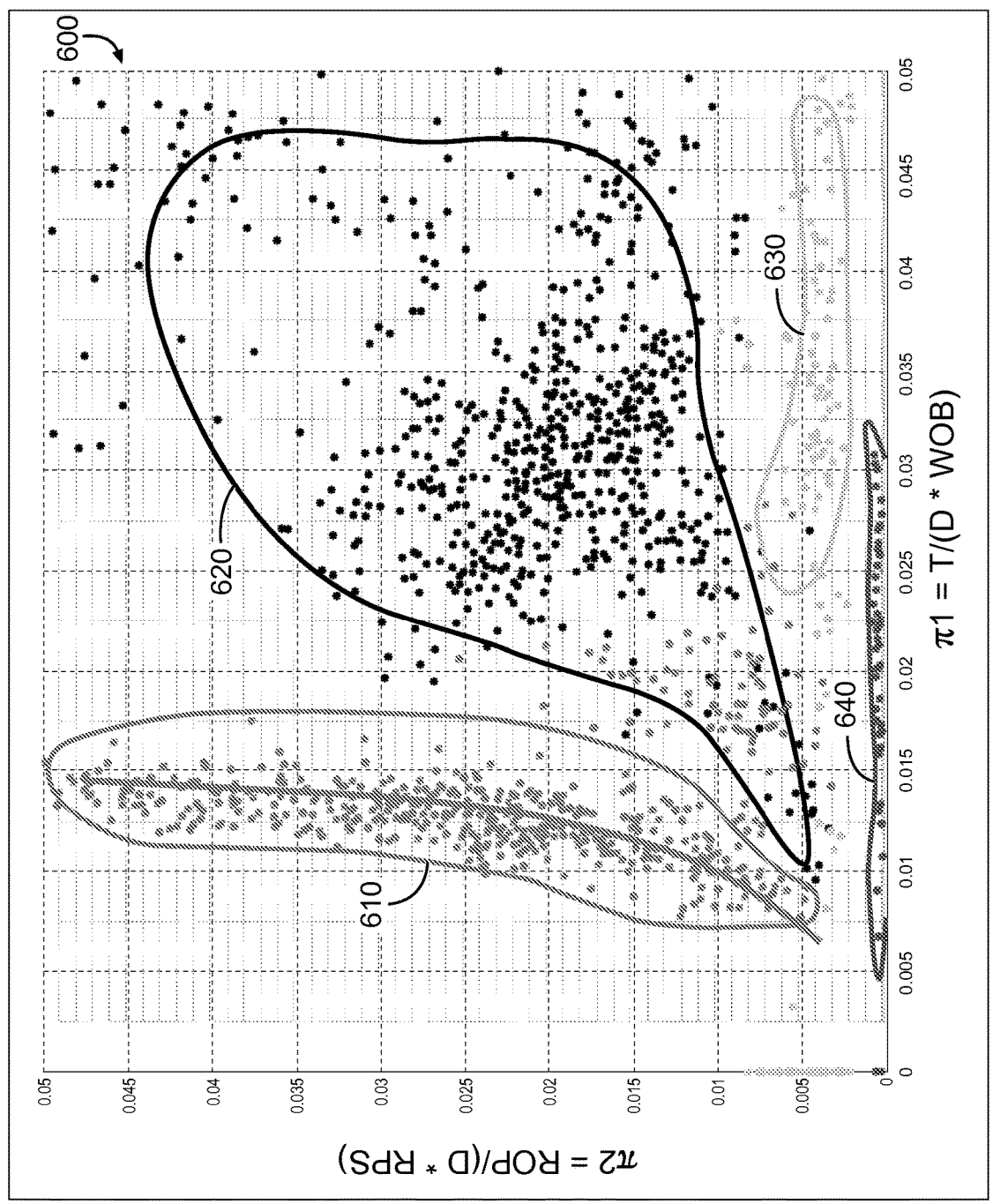
FIG. 6 is a π1-π2 plane projection view of the surface shown in FIG. 4, according to various embodiments of the invention.

Indeed, the surface 400 can be characterized by locating the clusters of data in defined areas. This is illustrated in FIGS. 5-6, which offer plane view projections of the 3D surface 400 shown in FIG. 4. For example, FIG. 5 is a $\pi 2$-$\pi 3$ plane projection view 500 of the surface 400 shown in FIG. 4, according to various embodiments of the invention. Here, the view 500 is provided using the values of $\pi 3$ for the vertical axis, and the values of $\pi 2$ for the horizontal axis. The areas of activity corresponding to the various bit types are clearly apparent, since the data has clustered into characterization areas 510 (associated with roller cone bits), 520 (associated with PDC bits), 530 (associated with impregnated bits type 1), and 540 (associated with impregnated bits type 2). Thus, an observer might learn that the characterization areas 530, 540 associated with impregnated bit activity exhibit very small values of $\pi 2$, and very high values of $\pi 3$, perhaps because the volume of rock drilled per revolution is very small. On the other hand, the characterization area 510 associated with roller cone bit activity exhibits relatively high values of $\pi 2$, and relatively low values of $\pi 3$.

Similarly, FIG. 6 is a $\pi 1$-$\pi 2$ plane projection view 600 of the surface 400 shown in FIG. 4, according to various embodiments of the invention. Here the characterization areas may become apparent due to the ratio T/WOB and the volume of rock drilled per revolution. For example, characterization area 610 shows a clear relationship between the values of $\pi n$ and the values of $\pi 2$ for roller cone bits. This behavior can be explained by the fact that the roller cone bits produce a limited torque, rolling on the bottom of the borehole, with a high cutting aggressiveness, resulting in a high ROP. As a matter of contrast, the characterization areas 630, 640 associated with impregnated bits of types 1 and 2, respectively, illustrate how rock is cut using a grinding mechanism, inducing friction and resulting in higher torque values, with a corresponding lower ROP. The performance of PDC bits, associated with the characterization area 620, lies between the areas 610 (associated with roller cone bits) and the areas 630, 640, associated with impregnated bits. Of course, the value of the ratio T/WOB might be different from one bit to another, and can affect the results shown. When one of ordinary skill in the art has review the information in this disclosure, as well as the attached figures, it will be realized that many embodiments may be realized.

Data Acquisition, Processing, and Control System

Figure 7:
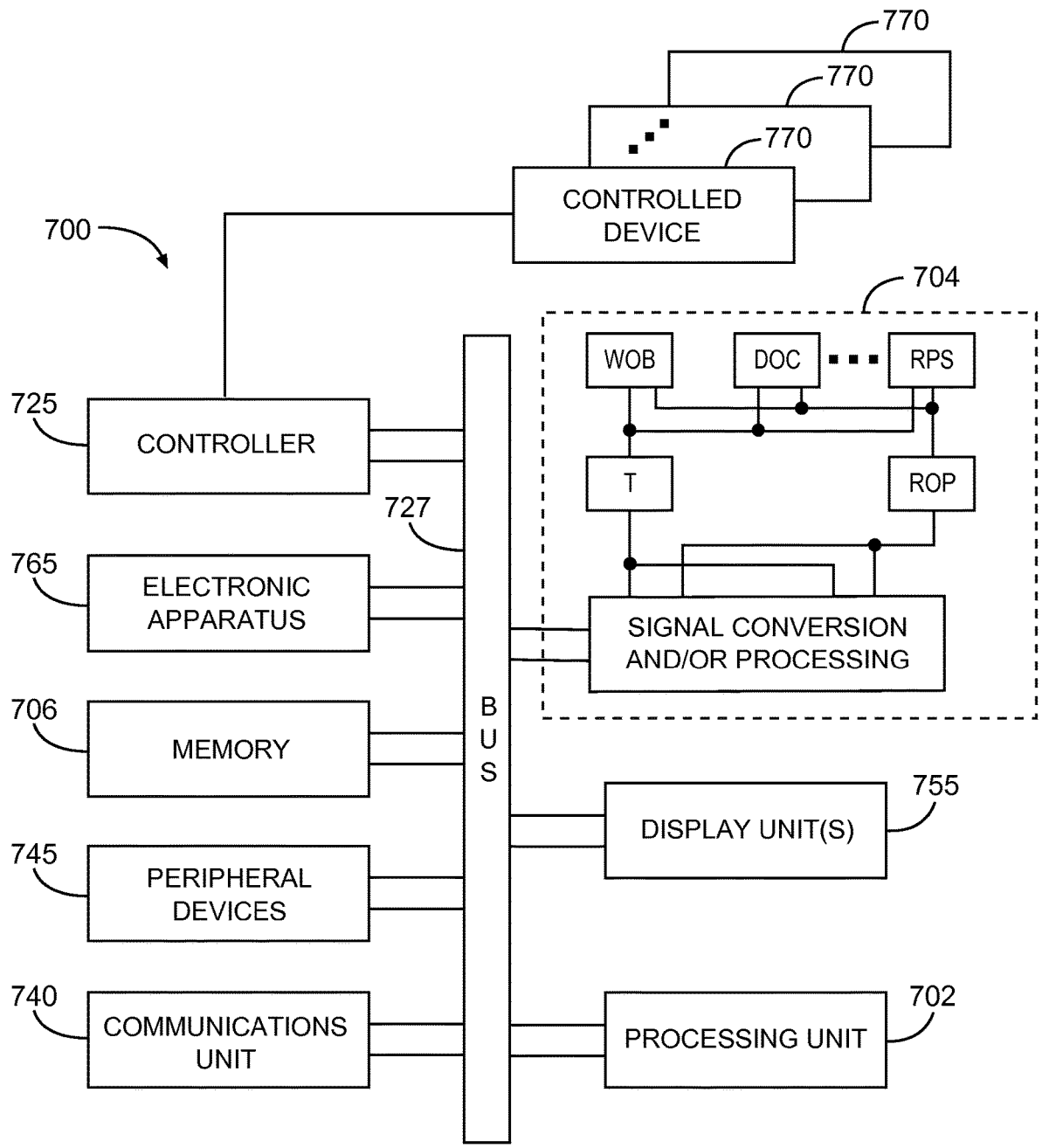
FIG. 7 is a block diagram of a data acquisition, processing, and control system according to various embodiments of the invention.

FIG. 7 is a block diagram of a data acquisition, processing, and control system 700 according to various embodiments of the invention. Here, it can be seen that the system 700 may include a controller 725 specifically configured to interface with a controlled device 770, such as a bit selection unit, geosteering unit, and/or a user display or touch screen interface, which may be include within, or separated from, displays 755. The system 700 may further include a number of sensors downhole, as part of the measurement device(s) 704. When configured in this manner, the system 700 can receive measurements and other data (e.g., corresponding to real-time measurements of drilling process variables) to be processed according to various methods described herein.

The processing unit 702 can be coupled to the measurement device(s) 704 to obtain measurements from the measurement device(s) 704, and its components, which may comprise a number of sensors to measure the values of a variety of drilling process variables, such as the WOB, T, (DoC=ROP/RPS), RPS, and ROP, among others. In some embodiments, a system 700 comprises a housing (not shown in FIG. 7; see FIG. 9) that can house the measurement device(s) 704, the controlled device 770, and other elements. The housing might take the form of a downhole tool as described in more detail below with reference to FIG. 9. The processing unit 702 may be part of a surface workstation or attached to a downhole tool housing.

The logging system 700 can include a controller 725, other electronic apparatus 765, and a communications unit 740. The controller 725 and the processing unit 702 can be fabricated to operate the measurement device(s) 704 to acquire measurement data, such as signals representing sensor measurements, perhaps resulting from drilling into a surrounding formation.

Electronic apparatus 765 (e.g., electromagnetic sensors, current sensors) can be used in conjunction with the controller 725 to perform tasks associated with taking measurements downhole. The communications unit 740 can include downhole communications in a drilling operation. Such downhole communications can include telemetry system operations.

The logging system 700 can also include a bus 727 to provide common electrical signal paths between the components of the system 700. The bus 727 can include an address bus, a data bus, and a control bus, each independently configured. The bus 727 can also use common conductive lines for providing one or more of address, data, or control, the use of which can be regulated by the controller 725.

The bus 727 can include instrumentality for a communication network. The bus 727 can be configured such that the components of the system 700 are distributed. Such distribution can be arranged between downhole components such as the measurement device(s) 704 and components that can be disposed on the surface of a well. Alternatively, several of these components can be co-located, such as on one or more collars of a drill string.

In various embodiments, the system 700 includes peripheral devices that can include displays 755, additional storage memory, or other controlled devices 770 that may operate in conjunction with the controller 725 or the processing unit 702. The display 755 can display diagnostic and measurement information for the system 700, based on the signals and surfaces generated according to embodiments described above.

In an embodiment, the controller 725 can be fabricated to include one or more processors. The display 755 can be fabricated or programmed to operate with instructions stored in the processing unit 702 (for example in the memory 706) to implement a user interface to manage the operation of the system 700, including any one or more components distributed within the system 700. This type of user interface can be operated in conjunction with the communications unit 740 and the bus 727. Various components of the system 700 can be integrated with the BHA shown in FIG. 9, which may in turn be used to house the measurement device(s) 704, such that processing identical to or similar to the methods discussed previously, and those that follow, can be conducted according to various embodiments that are described herein.

Methods

In some embodiments, a non-transitory machine-readable storage device comprises instructions stored thereon, which, when executed by a machine, transforms the machine into a customized, particular machine that performs operations comprising one or more features similar to or identical to those described with respect to the methods and techniques described herein. A machine-readable storage device, as described herein, is a physical device that stores information (e.g., instructions, data), which when stored, alters the physical structure of the device. Examples of machine-readable storage devices can include, but are not limited to, memory 706 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 702. Operating on these physical structures can cause the machine to become a specialized machine that performs operations according to methods described herein. The instructions can include instructions to cause the processing unit 702 to store associated data or other data in the memory 706. The memory 706 can store the results of measurements of formation parameters, drilling operation parameters, gain parameters, calibration constants, identification data, sensor location information, etc. The memory 706 can store a log of the measurement and location information provided by the system 700. The memory 706 therefore may include a database, for example a relational database.

Figure 8:
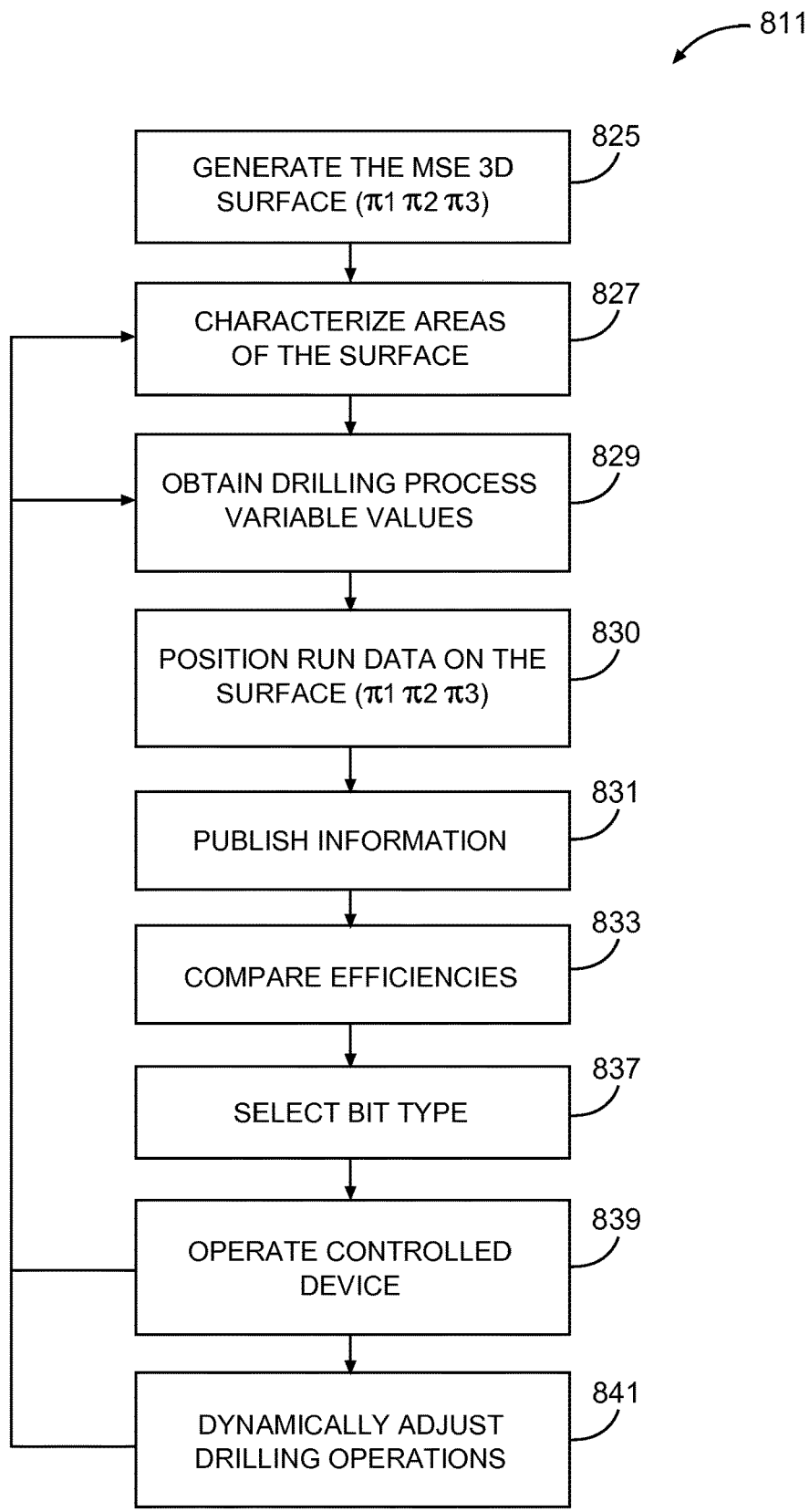
FIG. 8 is a flow diagram illustrating data acquisition, processing, and control methods, according to various embodiments of the invention.

FIG. 8 is a flow diagram illustrating data acquisition, processing, and control methods 811, according to various embodiments of the invention. The methods 811 described herein are with reference to the apparatus and systems shown in FIGS. 1-7. Thus, in some embodiments, a method 811 comprises generating a surface representing the MSE using dimensionless products of drilling process variables at block 825, characterizing one or more areas of the surface (e.g., according to drill bit types) at block 827 to locate run data on the generated surface and control the behavior of a controlled device at block 839.

In some embodiments, there are two modes of use: post run analysis, and real-time analysis. The post run analysis provides an opportunity to review bit selection decisions, as well as bit design and operational parameters applied during a drilling run (e.g., WOB, RPS). Thus, although most embodiments described herein are associated with real-time analysis, the scope of various potential embodiments is not to be so limited.

For example, in some embodiments a method 811 begins with generating a surface representing MSE as a function of dimensionless products of downhole drilling process variables at block 825.

Multiple dimensionless products can be determined, as described previously. For example, one of the dimensionless products might be proportional to torque, and inversely proportional to borehole diameter and WOB. Thus, in some embodiments, the dimensionless products may comprise a function of the torque, the borehole diameter, and the weight on bit.

Another dimensionless product might be proportional to the rate of penetration, and inversely proportional to borehole diameter and rate of revolution. Thus, in some embodiments, one of the dimensionless products comprises a function of the rate of penetration, the rate of revolution, and the borehole diameter.

Yet another dimensionless product might be proportional to the MSE and the square of the borehole diameter, and inversely proportional to the WOB. Thus, in some embodiments, one of the dimensionless products comprises a function of the borehole diameter, the weight on bit, and the MSE.

In some embodiments, the method 811 continues on to block 827 with characterizing areas of the surface that has been generated at block 825. This activity may include characterizing an area of the surface for different drill bit types. The act of characterizing the surface may include projecting the surface on a different plane. For example, two-dimensional graphs can be obtained by projecting the 3D surface 400 of FIG. 4 on the $\pi 1$-$\pi 2$ plane, the $\pi 1$-$\pi 3$ plane, or the $\pi 2$-$\pi 3$ plane. Thus, in some embodiments, characterizing the surface comprises projecting the surface as a two-dimensional view to provide a two-dimensional graph of the location of the run data. The activities of generating a surface at block 825 and characterizing the surface at block 827 can each be carried out by using a processing unit 702 that executes instructions stored in a memory 706 (see FIG. 7).

The drill bit types can be associated with measurements of the drilling process variables. Thus, in some embodiments, the activity at block 829 comprise associating different bit types with the drilling process variables. Drill bit types may comprise one or more of roller cone bits, impregnated bits, or PDC bits, among others.

In some embodiments, the method 811 may continue on to block 829 to include obtaining drilling process variable values. Such measurements may include the borehole diameter D (or area A), WOB, torque (T), DOC, rate of revolution, and ROP, among others, obtained downhole, while drilling in a geological formation. These values, which can be used to determine the MSE, may be obtained and processed in real-time, or after operations have occurred, perhaps from a library of data, or a database. Thus, the activity at block 821 may comprise obtaining data during drilling operations in a geological formation to define values of the drilling process variables.

In some embodiments, the method 811 may continue on to block 830 to include positioning run data on the surface that has been generated and characterized, at blocks 825 and 827, respectively. The run data may be obtained at block 829.

Relationships between the dimensionless variables (and thus, relationships between drilling process variables) can be published for viewing, perhaps in the form of the two-dimensional graphs shown in the figures. Thus, in some embodiments, the method 811 comprises publishing information associated with one or more characterizing locations on the surface as graphic information in a human-readable form at block 831. For the purposes of this document, "publishing . . . in human-readable form" means providing information in the form of a hardcopy printout, a display, or a projection, so as to be visible to humans. Such publication may occur with respect to the display units 755 and/or the controlled device 770 of FIG. 7. Many embodiments may thus be realized.

The behavior of drill bit types, including efficiencies, can be compared. Thus, in some embodiments, the method 811 continues on to block 833 to include comparing drilling efficiencies associated with different drill bit types based on one or more projected views of the generated surface.

Relationships between variables can be determined to assess drill bit behavior, to assist in controlling drilling operations. For example, drilling operations may be controlled in a manner that increases drilling efficiency (e.g., targeting lower values of MSE). Thus, in some embodiments, the method 811 includes, at block 837, selecting an alternative one of the drill bit types to increase drilling efficiency, perhaps based on the location of the run data. Thus, for example, if drilling operations include the use of an impreg bit and the run data appears on the generated surface in a low $\pi 3$ area, it means that the impreg bit is behaving more like a PDC bit, because the impreg bit is probably operating with the edge of its blades instead of the bottom surface of the blades. Therefore, it would be more appropriate to use a PDC bit—and the PDC bit can then be selected before drilling operations continue.

The method 811 may continue on to include, at block 839, operating a controlled device according to the location of run data associated with at least one of the different drill bit types and the characterization area(s) on the generated surface. For example, the controlled device 770 may be communicatively coupled to the processing unit 702, either directly, or indirectly, via the controller 725 (see FIG. 7).

Relationships between the dimensionless variables can be used to steer the drill bit. Thus, in some embodiments, the method 811 can also be applied to directional drilling since a change in the location of run data indicates a change in the geological formation. Therefore, the activity at block 839 may comprise operating a geosteering device to select a drilling direction in the geological formation, based on the location of the run data on the surface.

As noted previously, drill bits can be selected, based on compared efficiencies. Therefore, operating a controlled device at block 839 may comprise selecting one of several different drill bit types for use in drilling operations, based on the (compared) drilling efficiencies.

The controlled device may take the form of a drilling operator's display. Thus, in some embodiments, the activity at block 839 comprises operating the controlled device as an operator's video display that includes at least one of a 3D image of the generated surface or an image of the location of the run data on the generated surface in the form of a two-dimensional view.

Based on determined relationships between the dimensionless variables, one or more of the drilling process variables, such as the WOB, may be dynamically adjusted. Therefore, in some embodiments, the method 811 comprises dynamically adjusting drilling operations at block 841 to influence values of at least one of the drilling process variables as a function of a determined relationship between the dimensionless products, to improve drilling operation efficiency.

It should be noted that the methods described herein do not have to be executed in the order described, or in any particular order. Moreover, various activities described with respect to the methods identified herein can be executed in iterative, serial, or parallel fashion. In some embodiments, one or more activities in one method can be substituted for one or more activities in another method. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program, to perform the methods described herein. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment. Thus, other embodiments may be realized.

Systems

Figure 9:
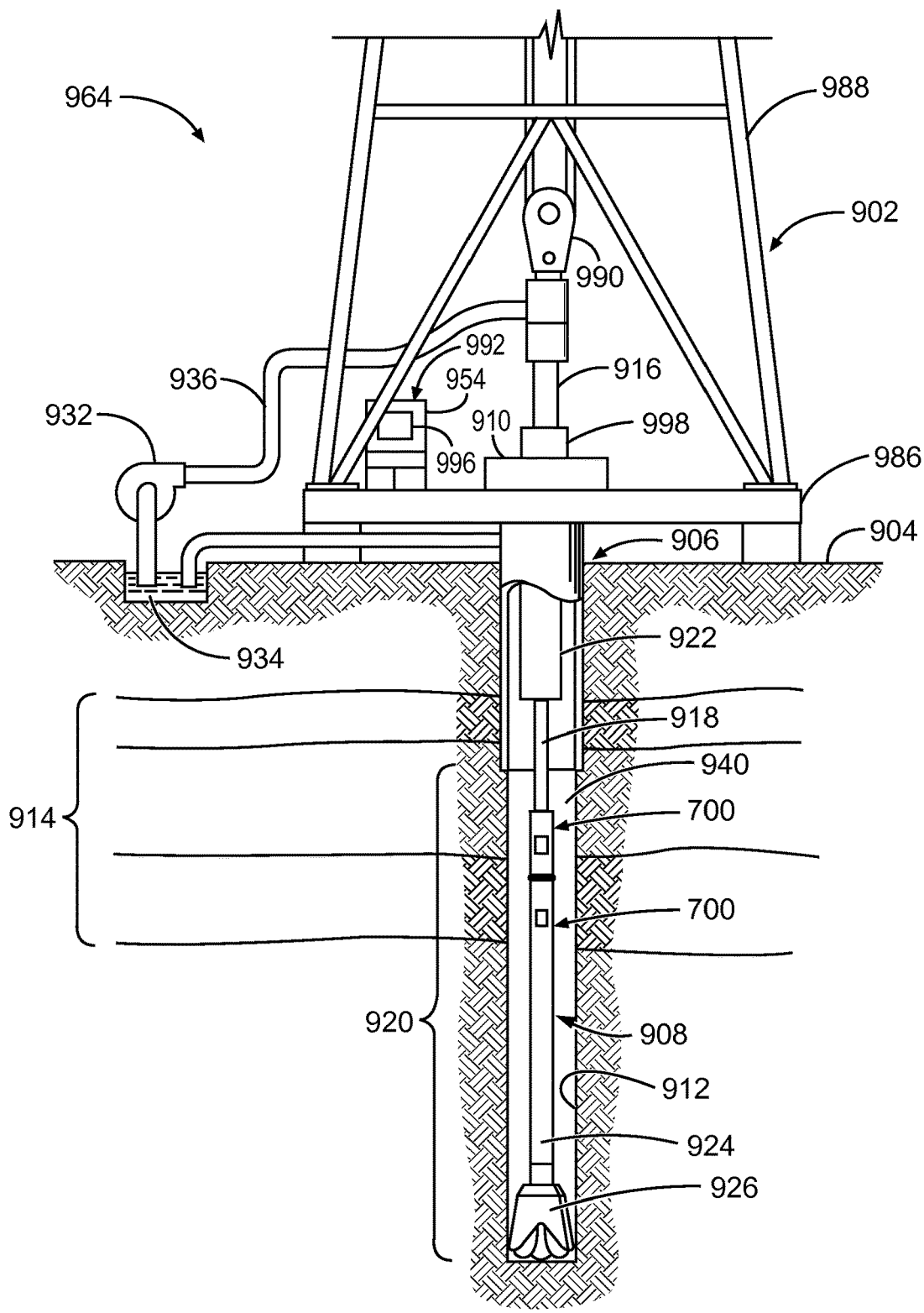
FIG. 9 depicts an example drilling rig system, according to various embodiments of the invention.

FIG. 9 depicts an example drilling rig system 964, according to various embodiments of the invention. The system 964 is operable to integrate or control a system 700 to conduct measurement operations in a wellbore, and to control drilling operations based on the characterization of generated surfaces, as previously described. Thus, the system 964 may comprise portions of a downhole tool 924 (e.g., a drilling operations tool) as part of a downhole drilling operation.

Drilling oil and gas wells is commonly carried out using a string of drill pipes connected together so as to form a drilling string that is lowered through a rotary table 910 into a wellbore or borehole 912. Here a drilling rig 902 is located at the surface 904 of a well 906. The drilling rig 902 may provide support for a drill string 908, via the drilling platform 986, the derrick 988, and hoist 990. The drill string 908 may operate to penetrate the rotary table 910 for drilling the borehole 912 through the subsurface formations 914. The drill string 908 may include a Kelly 916, drill pipe 918, and a bottom hole assembly 920, perhaps located at the lower portion of the drill pipe 918.

The bottom hole assembly 920 may include drill collars 922, a downhole tool 924, and a drill bit 926. The drill bit 926 may operate to create the borehole 912 by penetrating the surface 904 and the subsurface formations 914. The downhole tool 924 may comprise any of a number of different types of tools including MWD tools, LWD tools, and others.

During drilling operations, the drill string 908 (perhaps including the Kelly 916, the drill pipe 918, and the bottom hole assembly 920) may be rotated by the rotary table 910. Although not shown, in addition to, or alternatively, the bottom hole assembly 920 may also be rotated by a motor (e.g., a mud motor) that is located downhole. The drill collars 922 may be used to add weight to the drill bit 926. The drill collars 922 may also operate to stiffen the bottom hole assembly 920, allowing the bottom hole assembly 920 to transfer the added weight to the drill bit 926, and in turn, to assist the drill bit 926 in penetrating the surface 904 and subsurface formations 914.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation cuttings created by operating the drill bit 926.

In light of the foregoing discussion, it may be seen that in some embodiments, the system 964 may include a drill collar 922 and/or a downhole tool 924 to house one or more systems 700, including some or all of the components thereof. Thus, for the purposes of this document, the term "housing" may include any one or more of a drill collar 922 or a downhole tool 924 (each having an outer wall, to enclose or attach to magnetometers, sensors, fluid sampling devices, pressure measurement devices, transmitters, receivers, fiber optic cable, acquisition and processing logic, and data acquisition systems). The tool 924 may comprise a downhole tool, such as an LWD tool or MWD tool. Many embodiments may thus be realized.

For example, by referring to FIGS. 7 and 9, a system 964 may be seen to comprise a downhole tool body, such as a downhole tool 924 (e.g., an LWD or MWD tool body), and one or more components of the system 700 attached to the tool body. In this way, a downhole tool may be coupled to a processing unit that determines a relationship between dimensionless products. The determined relationship may then be used to control a controlled device.

In some embodiments, a system 964 comprises at least one downhole tool 924 configured to measure at least one drilling process variable. The system 964 may further comprise a processing unit 702 coupled to the at least one tool 924 to receive measured values of the at least one drilling process variable, as one of a plurality of drilling process variables, the processing unit 702 to generate values representing MSE as a function of dimensionless products of the drilling process variables, and to determine a relationship between some of the dimensionless products. The system 964 may further comprise a controlled device 770 coupled to the processing unit 702 to operate in response to the determined relationship.

The tool may be used to measure any one or more of the drilling process variables. Thus, in some embodiments, the at least one tool 924 comprises a measurement device to measure the at least one tool comprises a measurement device to measure at least one drilling process variable as at least one of torque, rate of penetration, rate of revolution, borehole diameter, or weight on bit, as well as a combination of these.

The controlled device may include a bit selection device. Thus, in some embodiments, the controlled device 770 comprises a bit selection mechanism to operate in response to an efficiency corresponding to the relationship determined between the dimensionless variables.

The controlled device may comprise a bit steering mechanism, such as a geosteering assembly. Thus, in some embodiments, the controlled device 770 comprises a bit steering mechanism.

Measured data can be stored, compressed, and transmitted, via a telemetry transmitter (e.g., as part of the communications unit 740) to transmit data, compressed or otherwise, to a surface computer 954. Displays units 755, 996 may form part of the system 964, and are used in some embodiments to display the measured data (e.g., drilling process variable values), as well as the 3D surfaces generated therefrom (e.g., using dimensionless variables), and/or any of the planar projections derived from the 3D surfaces.

Any of the above components, for example systems 700, 964 (and each of their elements) may all be characterized as "modules" herein. Such modules may include hardware circuitry, and/or a processor and/or memory circuits, software program modules and objects, and/or firmware, and combinations thereof, as desired by the architect of the apparatus and systems described herein, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus and systems are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Thus, many other embodiments may be realized.

Various Example Embodiments of the Invention

For example, referring now to FIGS. 1-9, it can be seen that in some embodiments, a method comprises generating a surface with a processing unit, the surface representing MSE as a function of dimensionless products of downhole drilling process variables; characterizing, by the processing unit, an area of the surface for different drill bit types; and operating a controlled device, communicatively coupled to the processing unit, according to a location of run data associated with at least one of the different drill bit types and the area on the surface.

In some embodiments, a method comprises obtaining data, in real-time during drilling operations in a geological formation, or from a stored data repository post-drilling, to define values of the drilling process variables.

In some embodiments, a method comprises selecting an alternative one of the drill bit types to continue drilling operations, to increase drilling efficiency, based on the location of the run data.

In some embodiments, operating the controlled device comprises operating a geosteering device to select a drilling direction in the geological formation, based on the location of the run data on the generated surface.

In some embodiments, the method comprises publishing information associated with the location on the generated surface, with the information illustrating a relationship between dimensionless variables derived from the drilling process variables, as graphic information in a human-readable form.

In some embodiments, the drilling process variables include torque, rate of penetration, rate of revolution, borehole diameter, and weight on bit, as well as the area or diameter of the borehole, among others.

In some embodiments, the dimensionless products comprises a function of the torque, the borehole diameter, and the weight on bit. In some embodiments, one of the dimensionless products comprises a function of the rate of penetration, the rate of revolution, and the borehole diameter. In some embodiments, one of the dimensionless products comprises a function of the borehole diameter, the weight on bit, and the mechanical specific energy.

In some embodiments, the method comprises associating the different bit types with the drilling process variables. This task may be accomplished in some embodiments, in part, by projecting the generated surface as a two-dimensional view to provide a two-dimensional graph of the location of the run data. In some embodiments, the method comprises comparing drilling efficiencies associated with the different drill bit types based on the view.

In some embodiments, operating the controlled device further comprises selecting one of the different drill bit types for use in drilling operations, based on the drilling efficiencies. In some embodiments, the different drill bit types comprise at least two of roller cone bits, impregnated bits, or polycrystalline diamond compact bits.

In some embodiments, operating the controlled device comprises operating the controlled device as an operator's video display that includes at least one of a 3D image of the generated surface or an image of the location of the run data on the surface in the form of a two-dimensional view.

In some embodiments, operating the controlled device comprises dynamically adjusting drilling operations to influence the values of at least one of the drilling process variables as a function of a determined relationship between the dimensionless products, to improve drilling operation efficiency.

Some embodiments take the form of a system. Thus, in some embodiments, a system comprises at least one downhole tool configured to measure at least one drilling process variable; a processing unit coupled to the at least one tool to receive measured values of the at least one drilling process variable, as one of a plurality of drilling process variables, the processing unit to generate values representing mechanical specific energy as a function of dimensionless products of the drilling process variables, and to determine a relationship between some of the dimensionless products; and a controlled device coupled to the processing unit to operate in response to the relationship.

In some embodiments, the at least one tool comprises a measurement device to measure the at least one drilling process variable as at least one of torque, rate of penetration, rate of revolution, borehole diameter, or weight on bit, as well as any combination of these. Other measurement devices may include calipers, to measure the diameter or area of the borehole.

In some embodiments, the controlled device comprises a bit selection mechanism to operate in response to an efficiency corresponding to the relationship. The bit selection mechanism may be a rotary mechanism to swap bits out on the end of the drill string, or a linear tray mechanism, to extend and retract bits on the end of the drill string. In some embodiments, the controlled device comprises a bit steering mechanism.

In summary, using the apparatus, systems, and methods disclosed herein may operate to provide a single 3D graph, in the form of a generated surface that makes use of dimensionless products and provides an easy way to related various drilling process variables using two-dimensional views. In this way, bit behaviors can be easily monitored according to their respective drilling efficiencies, with opportunities for comparison in a given application, and identification of parameters involved for improvements in efficiency. These advantages can significantly enhance the value of the services provided by an operation/exploration company, helping to reduce time-related costs, and providing greater return on investment.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method, comprising:
    generating a surface with a processing unit, the surface representing mechanical specific energy as a function of dimensionless products of downhole drilling process variables;
    characterizing, by the processing unit, an area of the surface for different drill bit types;
    operating a geosteering device, communicatively coupled to the processing to select a drilling direction in the geological formation, based on a location of run data on the surface; and
    obtaining data during drilling operations in a geological formation to define values of the drilling process variables.

2. The method according to claim 1, wherein the drilling process variables include torque, rate of penetration, rate of revolution, borehole diameter, and weight on bit.

3. The method according to claim 2, wherein one of the dimensionless products comprises a function of the torque, the borehole diameter, and the weight on bit.

4. The method according to claim 2, wherein one of the dimensionless products comprises a function of the rate of penetration, the rate of revolution, and the borehole diameter.

5. The method according to claim 2, wherein one of the dimensionless products comprises a function of the borehole diameter, the weight on bit, and the mechanical specific energy.

6. The method according to claim 1, further comprising:
    associating the different bit types with the drilling process variables.

7. The method according to claim 1, wherein characterizing the surface comprises:
    projecting the surface as a two-dimensional view to provide a two-dimensional graph of the location of the run data.

8. The method according to claim 7, further comprising:
    comparing drilling efficiencies associated with the different drill bit types based on the view.

9. The method according to claim 8, wherein operating the controlled device further comprises:
    selecting one of the different drill bit types for use in drilling operations, based on the drilling efficiencies.

10. The method according to claim 1, wherein the different drill bit types comprise at least two of roller cone bits, impregnated bits, or polycrystalline diamond compact bits.

11. The method according to claim 1, wherein operating the controlled device comprises:
    operating the controlled device as an operator's video display that includes at least one of a three-dimensional image of the surface or an image of the location of the run data on the surface in the form of a two-dimensional view.

12. The method according to claim 1, wherein operating the controlled device comprises:
    dynamically adjusting at least one of the drilling process variables as a function of a determined relationship between the dimensionless products, to improve drilling operation efficiency.

13. The method according to claim 12, further comprising:
    publishing at least some of the relationship as graphic information in a human-readable form.

14. The method according to claim 1, further comprising:
selecting an alternative one of the drill bit types to increase drilling efficiency, based on the location of the run data.

15. The method of claim 1, wherein the different drill bit types comprise roller cone bits, polycrystalline diamond compact (PDC) bits, or impregnated bits.

16. A system, comprising:
at least one downhole tool configured to measure at least one drilling process variable;
a processing unit coupled to the at least one tool to receive measured values of the at least one drilling process variable, as one of a plurality of drilling process variables, the processing unit configured to generate a surface representing mechanical specific energy as a function of dimensionless products of the drilling process variables, and to determine a relationship between some of the dimensionless products; and
a bit steering mechanism coupled to the processing unit to operate in response to a location of run data on the surface.

17. The system according to claim 16, wherein the at least one tool comprises a measurement device to measure the at least one drilling process variable as at least one of torque, rate of penetration, rate of revolution, borehole diameter, or weight on bit.

18. The system according to claim 16, wherein the controlled device comprises:
a bit selection mechanism to operate in response to an efficiency corresponding to the relationship.

19. The system of claim 16, further comprising a drill bit coupled to the bit steering mechanism.

20. The system of claim 19, wherein the drill bit comprises a roller cone bit, a polycrystalline diamond compact (PDC) bit, or an impregnated bit.

* * * * *